April 13, 1954     H. BLICKMAN     2,675,236
BICYCLE EXERCISING APPARATUS
Filed April 25, 1950
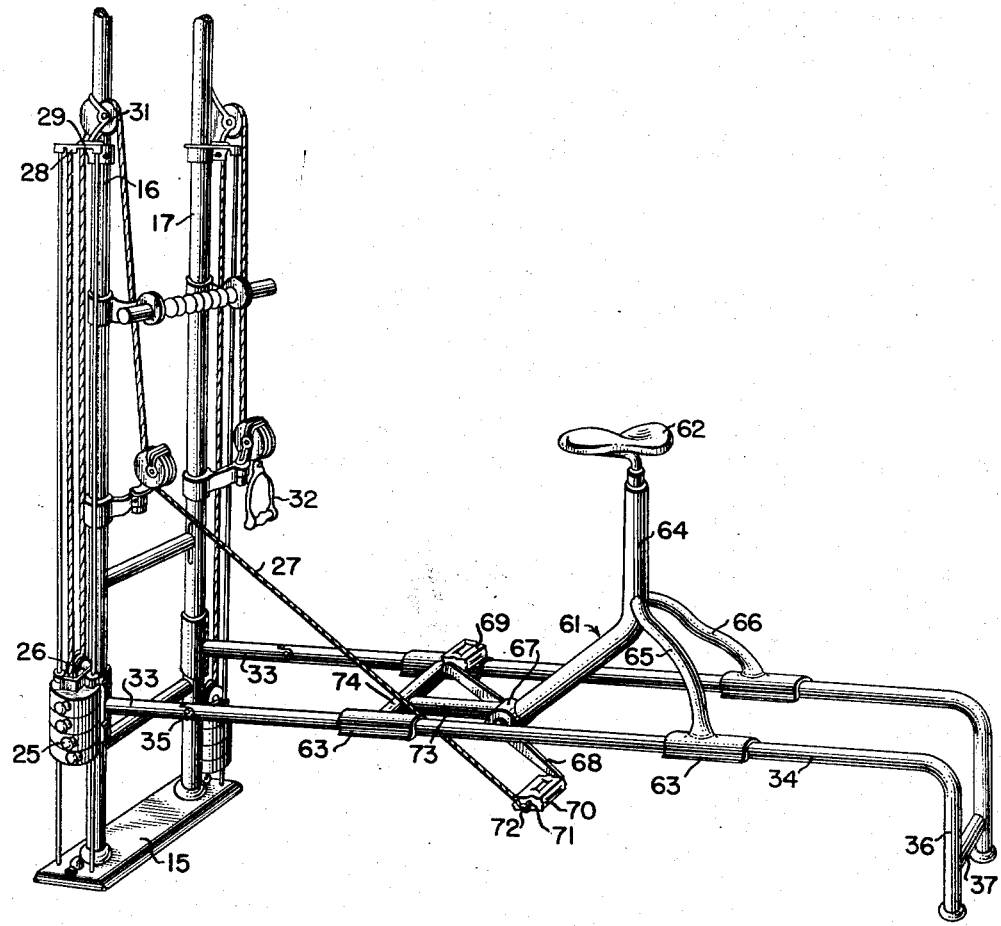
INVENTOR
HARRY BLICKMAN
BY *L. S. Saulsbury*
*his* ATTORNEY Patented Apr. 13, 1954

2,675,236

UNITED STATES PATENT OFFICE 2,675,236

BICYCLE EXERCISING APPARATUS

Harry Blickman, New York, N. Y.

Application April 25, 1950, Serial No. 157,876

1 Claim. (Cl. 272—73)

This invention relates to exercising apparatus.

It is an object of the present invention to provide in exercising apparatus means whereby the pull cord weights can be applied to bicycle pedals to give the necessary weight and resistance to their operation.

Other objects of the invention are to provide a bicycle exercising apparatus which is simple in construction, easy to install on the main parts of the apparatus, inexpensive to manufacture, compact, has a minimum number of parts, of sturdy construction and efficient in operation.

For other objects and for a better understanding of the invention, reference may be had to the following detailed description taken in connection with the accompanying drawing, in which A single figure is an enlarged fragmentary perspective view of a weight apparatus with parallel bars extending therefrom and a bicycle attachment resting upon the parallel bars and connected through its pedals with pull cords of the weight apparatus.

Referring now particularly to the single figure, 15 represents a base to which are connected laterally spaced vertical supports 16 and 17.

At each side of the apparatus are pull weights 25, having a pulley 26 over which extends a pull cable cord 27 that is fixed at 28 to a bracket 29 connected at an elevated position upon the vertical support and which carries a top pulley 31. One pull cord may extend over the pulley 31 and has a handle 32 detachably connected to it.

Also secured to each vertical support near to the base 15 is a T bracket 33 to which a parallel bar 34 is pivotally connected for hinge adjustment and about pivot pin connection 35. Each parallel bar 34 is turned down at its free end, as indicated at 36, to support the main horizontal portion of the bar. A transverse member 37 connects together the turned down support portions of the bars. These bars can be elevated when the apparatus is not in use.

Rested upon the parallel bars 34, is a bicycle seat structure 61 having a seat element 62 and plural half sleeve feet portions 63 adapted to rest upon parallel bars 34. This seat structure includes a main and bent central post 64 from which extends rearwardly legs 65 and 66 to which there is secured the respective feet portions 63. The lower end of the post 64 has a bearing assembly 67 in which a pedal arm attachment 68 is journalled by its crank axle. This pedal arm attachment has two pedals 69 and 70 and to one of which is connected the cable cord 27. This cable cord has a hook 71 which is releasably connected to a projection 72 on the pedal 70. The gymnast sits on the seat 62 and places his feet upon the pedals 69 and 70 and by operation of the pedals the weights 25 will be lifted whereby the legs of the gymnast will be strengthened. Since the number of weights 25 can be varied, the arrangement can be adapted for the different gymnasts and in accordance with their respective strength. The bearing structure 67 has a forwardly extending arm 73 to which cross piece 74 is connected. This cross piece 74 has the respective feet portions 63.

While various changes may be made in the detail construction, it shall be understood that such changes shall be within the spirit and scope of the present invention as defined by the appended claim.

I claim:

A bicycle exercising apparatus comprising a base, vertical supports extending upwardly from the base and laterally spaced from each other, adjustable weights slidable upon the vertical supports, pulley and cable cord means upon the vertical supports for lifting the weights thereof, parallel bars extending respectively laterally from the respective vertical supports, a pedal arm attachment having a seat thereon and feet-engaging portions adapted to rest upon the parallel bars, said pedal arm attachment having a longitudinally-extending upwardly bent central post and a cross piece connected to the forward end of the central post and having two forward feet portions thereon, leg portions extending laterally from the central post and respectively having two rear feet portions thereon, a double crank and bearing means on the central post rotatably receiving the double crank, pedals respectively fixed to the respective arms of the double crank, a seat mounted upon the upper end of the central post and said pulley and cable cord means connected to one of the arms of the double crank.

References Cited in the file of this patent

UNITED STATES PATENTS

| Number | Name | Date |
|---|---|---|
| 374,496 | Reach | Dec. 6, 1887 |
| 1,052,962 | Reach | Feb. 11, 1913 |
| 1,114,458 | Friedli | Oct. 20, 1914 |
| 1,646,818 | Holland | Oct. 25, 1927 |
| 1,744,607 | Baine | Jan. 21, 1930 |
| 1,752,412 | Blickman | Apr. 1, 1930 |
| 1,890,696 | Rosenhahn | Dec. 13, 1932 |
| 1,928,089 | Blickman | Sept. 26, 1933 |
| 2,472,391 | Albizu | June 7, 1949 |